Patented June 16, 1953

2,642,463

UNITED STATES PATENT OFFICE 2,642,463

METAL TUNGSTITE CATALYZED HYDROGENATION PROCESS

Herrick R. Arnold, Wilmington, and James E. Carnahan, New Castle, Del., assignors to E. I. du Pont de Nemours & Company, Wilmington, Del., a corporation of Delaware No Drawing. Application January 30, 1951, Serial No. 208,663

18 Claims. (Cl. 260—638)

This invention relates to hydrogenation processes and more particularly to a novel catalytic hydrogenation process.

It is an object of this invention to provide a novel catalytic hydrogenation process. Other objects will appear hereinafter.

This invention provides an improved process for hydrogenating organic compounds capable of undergoing hydrogenation in the presence of a hydrogenation catalyst, the improvement residing in reacting with hydrogen said organic compound in the presence of a metal tungstite which corresponds in composition to a metal salt of an acid having one of the formulae $H_2WO_2$ and $H_2WO_3$.

The metal tungstites which are used as catalysts in the practice of this invention are the products described and claimed in our contemporaneously filed and copending application Ser. No. 208,662.

These metal tungstites are obtained by reacting, in the presence of excess ammonia, in stoichiometric proportions, ammonium tungstate with a salt of the metal whose tungstite is desired, washing the precipitate which forms, filtering it, drying it and then calcining it for from 4 to 24 hours at 350 to 500° C. The calcined material, in granular or powdered form, is then reduced in a hydrogen-containing atmosphere at temperatures ranging from room temperature up to 700° C., the heating being gradual and extending over a period varying from 2 to 100 hours depending upon the temperature schedule used.

In practicing one embodiment of this invention as a liquid-phase batch operation, a pressure reactor is charged with the catalyst and material to be hydrogenated, and if desired, an inert solvent. The reactor is then charged with hydrogen and heating and agitation are started. The pressure within the system is maintained by periodic injection of hydrogen to compensate for that which is absorbed in the reaction. After reaction is complete, the reactor is permitted to cool, opened and the contents discharged and filtered, or centrifuged, to remove the catalyst. The reaction product, if it is not pure directly, can be isolated by distillation or by other means known to those skilled in the art.

The examples which follow are submitted to illustrate and not to limit this invention.

Example I

A 400 cc. pressure reactor was charged with 100 g. (1.3 moles) of benzene and 5 g. of nickel tungstite, prepared as described hereinafter. The reactor was pressured with hydrogen, then heated at 160 to 170° C., under which conditions the pressure was 200 atmospheres. These conditions were maintained for 5 hours, while maintaining the pressure by periodic injections of hydrogen as required. From the reaction mixture cyclohexane was recovered in essentially quantitative conversion.

Example II

Acetone (100 g., 1.7 moles) was hydrogenated at 150-175° C. under 200 atmospheres total pressure during 3 to 4 hours in the presence of 5 g. of nickel tungstite, prepared as described subsequently. From the reaction mixture there was isolated isopropanol in 65 to 79% conversion.

Example III

A 400 cc. pressure reactor was charged with acetone (100 g., 1.7 moles), ammonia (51 g., 3 moles), water (1.8 g., 0.1 mole) and 5 g. of nickel tungstite, prepared as described subsequently. This mixture was shaken at 25 to 30° C. under autogeneous pressure for one hour, then pressured with hydrogen and heated up to 150° C. The pressure was maintained in the range of 135 to 200 atmospheres by periodic repressuring with hydrogen for three hours. From the reaction mixture there was isolated isopropylamine in 30 to 35% conversion, together with unconverted acetone and high boiling amines.

Example IV

Propionitrile (100 g., 1.8 moles) was converted to normal propylamine in 30% conversion and di-n-propylamine in 40% conversion by hydrogenation for 4 hours at 170-175° C. under 135 to 200 atmospheres pressure in the presence of 5 g. of nickel tungstite catalyst, prepared as described subsequently.

Example V

Nitrobenzene (100 g., 0.8 mole) dissolved in methanol (100 cc.) and containing 5 g. of nickel tungstite, prepared as described subsequently, was hydrogenated at 120° C. at 70 to 100 atmospheres pressure for one to two hours. From the reaction mixture aniline was isolated in 80% conversion.

The nickel tungstite used in the examples was prepared as follows. Four moles of ammonium tungstate $[(NH_4)_2WO_4]$ in a 14% aqueous solution, prepared by dissolving 1080 g. of ammonium paratungstate $[(NH_4)_6W_7O_{24}.6H_2O]$ in 7000 cc. of water and 310 cc. of 28% aqueous ammonia at 85° C., was added with stirring to 4 moles of nickel nitrate in a 10% solution, prepared by dissolving 1163 g. of nickel nitrate hexahydrate in 6000 cc. of water at 85° C. A pale green precipitate was formed in a slurry having a pH of approximately 6. The pH of the slurry was adjusted to 7 at 75° C. by addition of 404 cc. of 28% aqueous ammonia. The resulting precipitate was washed, filtered, dried, and calcined at 400° C. The product thus obtained was charged into a furnace and heat-treated at 400° C. in a stream of nitrogen at a space velocity of 390 liters per liter per hr. for 12 hours, cooled to room temperature in nitrogen and the product then reduced for 24–47 hours at 450–480° C. in hydrogen at a space velocity of 600–1000 liters of gas per liter of catalyst per hour. The reduced product corresponded by analysis to nickel tungstite ($NiWO_2$) containing a slight excess $W_2O_3$. Magnetic measurements showed that essentially all of the nickel was present in a chemically combined state. The product was not spontaneously pyrophoric when exposed to air at room temperature. On warming slightly over an open flame, however, it ignited with a bright glow and oxidized to yellow nickel tungstate.

*Example VI*

A 400 cc. pressure reactor was charged with 100 g. (1.7 mole) of acetone and 5 g. of copper tungstite. The reactor was pressured with hydrogen so that at 200° C. the pressure within the reactor ranged between 170 and 200 atmospheres. These conditions were maintained for 3 hours. During this period of reaction 60% of the theoretical amount of hydrogen required for the complete reduction of the acetone was absorbed. The reaction was interrupted and the mixture distilled. There were obtained 46 g. of isopropanol boiling at 80–82° C. at atmospheric pressure. This corresponds to a 45% conversion of the acetone to isopropanol.

The preparation of the copper tungstite catalyst used in the above Example VI is as follows:

An ammonium tungstate solution containing 2 moles of tungsten was prepared by dissolving 553 grams of ammonium metatungstate $$[(NH_4)_2W_4O_{13} \cdot 7H_2O]$$

in 3 liters of water, and adding 182 grams (202.5 cc.) of 28% aqueous ammonia to convert the ammonium metatungstate to normal ammonium tungstate $[(NH_4)_2WO_4]$.

To this solution was added with stirring at room temperature a solution containing 2 moles of cupric nitrate prepared by dissolving 483.3 grams of $Cu(NO_3)_2 \cdot 3H_2O$ in 3 liters of water. A light-blue precipitate formed in a slurry having a pH of 4.6. The pH of the slurry was adjusted to 7.0 by addition of 122 cc. of 28% aqueous ammonia. The resulting precipitate was washed, filtered, and dried at 120–130° C. The product was then reduced in a 3:1 nitrogen-hydrogen gas mixture at 500 space velocity for 32 hours starting at room temperature and increasing the temperature of reduction to 500° C. in 25 hours, holding the reduction temperature at 500° C. for 5 hours, then cooling to room temperature, in hydrogen. The reduced product corresponded by analysis to copper tungstite ($CuWO_2$) as follows:

|  | Percent Cu | Percent W | Ratio, Cu:W |
|---|---|---|---|
| Calculated | 21.95 | 63.50 | 1:1 |
| Found | 23.50 | 62.35 | 1:0.93 |

Hydrogenation processes involving metal tungstite catalysts can be carried out in the presence or absence of a solvent or diluent. For each individual reaction system, the choice is governed by such considerations as need for providing a medium which will afford better than usual contact between reactants and catalyst, need for simplifying the recovery of products, or need for exerting other beneficial effects upon an otherwise less efficient process. Suitable solvents or diluents are any materials which are inert to hydrogenation under the conditions used. Such solvents or diluents may be water, sulfuric acid, phosphoric acid or aqueous alkali or an organic material such as an alcohol, ether or hydrocarbon. Specific examples of organic materials are methanol, ethanol, butanol, cyclohexanol, isopropanol, dioxane, diethyl ether, cyclohexane, and the like.

The catalysts used in the practice of this invention are the metal tungstites described in our aforementioned contemporaneously filed and copending application. In said copending application there are disclosed the specific metal tungstites, nickel tungstite, cobalt tungstite, iron tungstite, copper tungstite, zinc tungstite, silver tungstite, cadmium tungstite, manganese tungstite and tin tungstite. Preferred catalysts because of their high degree of activity and selectivity are the tungstites of nickel, cobalt, copper, iron and zinc. These tungstites may also be employed in admixture or may contain modifiers or promoters such as, barium, cadmium, chromium, thorium, etc., as desired. They can be used effectively in the form of pellets or as finely divided powders. They may also be used as such as blended with molybdites of the type disclosed and claimed in our copending application, U. S. Ser. No. 111,982, filed August 23, 1949, now Patent No. 2,572,300, issued October 23, 1951, or they may be extended on inert supports such as charcoal, alumina, silica, etc. The particular form of catalyst for maximum activity depends upon the conditions under which the hydrogenation reaction is to be effected. Thus, for vapor or liquid phase continuous operation it is best to have the catalyst in the form of pellets, thus minimizing mechanical losses. If the process is to be operated as a batch operation, it is best that the catalyst be in finely divided form because in this way maximum catalyst activity is obtained.

The amount of catalyst employed depends upon such interdependent variables as temperature, pressure, desired mode of operation, desired duration of contact time, kind of compound being hydrogenated, etc. In general the amount of catalyst used is that needed to bring about reaction at a suitable rate under the conditions employed. Usually in batch operation the amount will vary from about 0.01% to about 10% by weight of the compound being hydrogenated.

In continuous operation the weight of material being hydrogenate at any given instant is ordinarily less than the weight of the catalyst, but the total weight of material which may be hydrogenated during the active life of the catalyst is usually at least ten times the catalyst weight.

In general, the process of this invention is operable at temperatures within the range of from 25 to 500° C. As a rule the hydrogenation is conducted at temperatures in the range of 70 to 450° C. because under these conditions the reaction takes place at a practical rate with the formation of the desired products in maximum yields.

The process of this invention can be carried out either as a liquid or vapor phase batch operation, or as a liquid or vapor phase semi-continuous or continuous operation.

In the practice of this invention there can be used any organic compound capable of undergoing hydrogenation in the presence of a hydrogenation catalyst. Examples of such compounds are those which have carbon-carbon unsaturation, those which have carbon-nitrogen unsaturation, those which have nitrogen-oxygen unsaturation, those which have carbon directly bonded to oxygen by a single or by a multiple bond, those which have sulfur-oxygen unsaturation, and sulfur compounds of the following formula:

(1) 

(2) 

(3) 

in which $m$ and $n$ stand for small integers from 1 to 10 and R, R', and R'' stand for aliphatic or cycloaliphatic groups. These groups may be saturated or unsaturated and may contain also functional groups or linkages such as hydroxyl, amino, substituted amino, halogen, carbonyl, carboxyl, aryl, nitro, ether, amide, or ester groups.

Specially useful compounds falling within the above classes are those compounds which have carbon joined by a multiple bond to another atom, that is having a plurality bonded carbon atom.

The compounds having carbon-carbon unsaturation fall into three main groups, namely, those in which the unsaturation is ethylenic, those in which the unsaturation is benzenoid, and those in which the unsaturation is acetylenic. Sub-classes of these compounds are those having multiple unsaturated linkages of either like or unlike types.

Examples of compounds having ethylenic unsaturation are butadiene cyclic sulfone, dihydropyran, 2-butenediol-1,4, maleic esters, and the olefin hydrocarbons such as ethylene, propylene, butylenes, cyclopentene, cyclohexene, etc., and polymeric hydrocarbons such as rubber and the like.

Compounds having benzenoid unsaturation are benzene, phenol, cresols, xylenols, naphthalene, naphthols, diphenyl, diphenylmethane, aniline, toluidines, N-methylaniline, naphthylamines, benzidine, p,p'-phenylenediamine, pyridine, picoline, and the like.

Compounds having carbon-nitrogen unsaturation include the nitriles, oximes, Schiff bases, azines, and the like.

Examples of nitriles are acetonitrile, propionitrile, succinonitrile, adiponitrile, sebaconitrile, olenonitrile, stearonitrile, benzonitrile, and the like.

Examples of oximes are acetaldoxime, diacetylmonoxime, benzaldoxime, camphoroxime, and the like.

Examples of Schiff's bases are benzal phenylimine, phenyl quinonediimine, and the like.

Examples of azines are benzalazine, diphenylketazine, and the like.

Compounds having carbon directly bonded to oxygen by a single or double bond fall into four groups, namely the oxo an non-oxo carbonyl compounds, ethers, and alcohols.

Examples of oxo-carbonyl compounds are acetone, methyl ethyl ketone, dipropyl ketone, dioctadecyl ketone, mesityl oxide, phorone, camphor, acetaldehyde, benzaldehyde, dodecanal-1, and the like.

Examples of non-oxo carbonyl compounds are carboxylic acids, their esters, amides, and imides. Examples are acetic acid, propionic acid, tartaric acid, oleic acid, linoleic acid, ricinoleic acid, China-wood oil, sperm oil, ethyl laurate, methyl stearate, sorbic acid, palmitic acid, palmitamide, rosin, benzoic acid, phthallic acid, phthalimide, and the like.

Examples of ethers are tetrahydrofuran, phenyl methyl ether, diethyl ether, methyl amyl ether, naphthyl ethyl ether, and the like.

Examples of alcohols are benzyl alcohol, ethyl alcohol, dodecanol-1, octadecanol-1, cyclohexanol, and the like.

Compounds having nitrogen-oxygen unsaturation are the nitro and nitroso compounds such as nitrobenzene, nitrotoluene, 1,4-dinitrobenzene, nitrosobenzene, nitropropane, nitrobutane, and the like.

Compounds having sulfur to oxygen unsaturation are the sulfonic and sulfinic acids such as benzene sulfonic acid, benzene sulfinic acid, and the like.

Examples of sulfur compounds of Formula 1 are di-tertiary butyl sulfide, di-n-amyl sulfide, methyl dodecyl sulfide, di-isoamyl disulfide, dioctyl disulfide, didodecyl sulfide, di-allyl sulfide, diallyl disulfide, diallyl trisulfide, allyl butyl sulfide, dioleyl sulfide, dicyclohexyl sulfide, dibornyl disulfide, cyclohexyl methyl sulfide, dicyclopentyl disulfide, di-p-menthenyl sulfide, and the like.

Sulfides of Formula 2 are ethylene sulfide, ethylene disulfide, divinyl disulfide, trimethylene sulfide, trimethylene disulfide, dihydrothiophene, tetrahydrothiophene, tetrahydrothiopyrane, thioxane, 1,4-dithiane, sym.-trithiane, and the like.

Sulfides of Formula 3 are the thioacetals such as methylene-bis-octyl sulfide, ethylidene-bis-dodecyl sulfide, thioketals such as 2-propylidene-bis-heptyl sulfide, thiodiglycol, bis(beta-oxyethyl) disulfide, sorbityl dodecyl sulfide, disorbityl disulfide, beta, beta'-diaminodiethyl disulfide, methylene-bis-thioglycolic acid, and the like.

The process of this invention is an improvement over the art in providing a catalyst which has at one time a high degree of selectivity in many types of hydrogenations and an exceptional degree of stability in highly corrosive media. The catalyst is not easily susceptible to poisoning and is readily reactivated when coated with tars or otherwise loses activity.

As many apparently widely different embodiments of this invention may be made without departing from the spirit and scope thereof, it is to be understood that this invention is not limited to the specific embodiments thereof except as defined in the appended claims.

We claim:

1. In a process for the hydrogenation of an organic compound capable of undergoing hydrogenation with hydrogen in the presence of a hydrogenation catalyst, the improvement which comprises reacting with hydrogen said organic compound capable of undergoing hydrogenation, at a temperature within the range of 25° to 500° C., and in contact with a metal tungstite which is the metal salt of an acid selected from the class consisting of the acid having the formula $H_2WO_2$ and the acid having the formula $H_2WO_3$, and said metal being selected from the class consisting of nickel, cobalt, iron, copper, zinc, silver, cadmium, manganese and tin.

2. In a process for the hydrogenation of an organic compound capable of undergoing hydrogenation with hydrogen in the presence of a hydrogenation catalyst, the improvement which comprises reacting with hydrogen said organic compound capable of undergoing hydrogenation, at a temperature within the range of 70° to 450° C., and in contact with a nickel tungstite having the formula $NiWO_2$.

3. In a process for the hydrogenation of an organic compound capable of undergoing hydrogenation with hydrogen in the presence of a hydrogenation catalyst, the improvement which comprises reacting with hydrogen said organic compound capable of undergoing hydrogenation, at a temperature within the range of 70° to 450° C., and in contact with a copper tungstite having the formula $CuWO_2$.

4. In a process for the hydrogenation of an organic compound having a plurally bonded carbon atom and capable of undergoing hydrogenation with hydrogen in the presence of a hydrogenation catalyst, the improvement which comprises reacting with hydrogen said organic compound having a plurally bonded carbon atom, at a temperature within the range of 70° to 450° C., and in contact with a metal tungstite which is the metal salt of an acid selected from the class consisting of the acid having the formula $H_2WO_2$ and the acid having the formula $H_2WO_3$, and said metal being selected from the class consisting of nickel, cobalt, iron, copper, zinc, silver, cadmium, manganese and tin.

5. In a process for the hydrogenation of an organic compound having a carbon-to-oxygen double bond and capable of undergoing hydrogenation with hydrogen in the presence of a hydrogenation catalyst, the improvement which comprises reacting with hydrogen said organic compound having a carbon-to-oxygen double bond, at a temperature within the range of 70° to 450° C., and in contact with a metal tungstite which is the metal salt of an acid selected from the class consisting of the acid having the formula $H_2WO_2$ and the acid having the formula $H_2WO_3$, and said metal being selected from the class consisting of nickel, cobalt, iron, copper, zinc, silver, cadmium, manganese and tin.

6. In a process for the hydrogenation of an organic compound having nitrogen-oxygen unsaturation and capable of undergoing hydrogenation with hydrogen in the presence of a hydrogenation catalyst, the improvement which comprises reacting with hydrogen said organic compound having nitrogen-oxygen unsaturation, at a temperature within the range of 70° to 450° C., and in contact with a metal tungstite which is the metal salt of an acid selected from the class consisting of the acid having the formula $H_2WO_2$ and the acid having the formula $H_2WO_3$, and said metal being selected from the class consisting of nickel, cobalt, iron, copper, zinc, silver, cadmium, manganese and tin.

7. In a process for the hydrogenation of an organic compound having carbon-to-carbon unsaturation and capable of undergoing hydrogenation with hydrogen in the presence of a hydrogenation catalyst, the improvement which comprises reacting with hydrogen said organic compound having carbon-to-carbon unsaturation, at a temperature within the range of 70° to 450° C., and in contact with a metal tungstite which is the metal salt of an acid selected from the class consisting of the acid having the formula $H_2WO_2$ and the acid having the formula $H_2WO_3$, and said metal being selected from the class consisting of nickel, cobalt, iron, copper, zinc, silver, cadmium, manganese and tin.

8. In a process for the hydrogenation of acetone to isopropanol, the improvement which comprises reacting with hydrogen said acetone, at a temperature within the range of 70° to 450° C., and in contact with a metal tungstite which is the metal salt of an acid selected from the class consisting of the acid having the formula $H_2WO_2$ and the acid having the formula $H_2WO_3$, and said metal being selected from the class consisting of nickel, cobalt, iron, copper, zinc, silver, cadmium, manganese and tin.

9. In a process for the hydrogenation of acetone to isopropanol, the improvement which comprises reacting with hydrogen said acetone at a temperature within the range of 70° to 450° C., and in contact with a nickel tungstite having the formula $NiWO_2$.

10. Process as set forth in claim 4 in which the metal tungstite is nickel tungstite.

11. Process as set forth in claim 4 in which the metal tungstite is copper tungstite.

12. Process as set forth in claim 5 in which the metal tungstite is nickel tungstite.

13. Process as set forth in claim 5 in which the metal tungstite is copper tungstite.

14. Process as set forth in claim 6 in which the metal tungstite is nickel tungstite.

15. Process as set forth in claim 6 in which the metal tungstite is copper tungstite.

16. Process as set forth in claim 7 in which the organic compound hydrogenated is benzene.

17. Process as set forth in claim 4 in which the organic compound hydrogenated is propionitrile.

18. Process as set forth in claim 6 in which the organic compound hydrogenated is nitrobenzene.

HERRICK R. ARNOLD.
JAMES E. CARNAHAN.

References Cited in the file of this patent

UNITED STATES PATENTS

| Number | Name | Date |
|---|---|---|
| 2,503,050 | Jacobs | Apr. 4, 1950 |

OTHER REFERENCES

Mellor: Comprehensive Treatise on Inorganic and Theoretical Chemistry, vol. 11 (1931), pp. 750, 782 and 802. Longmans Green and Co., publishers, New York.